Figure 1:
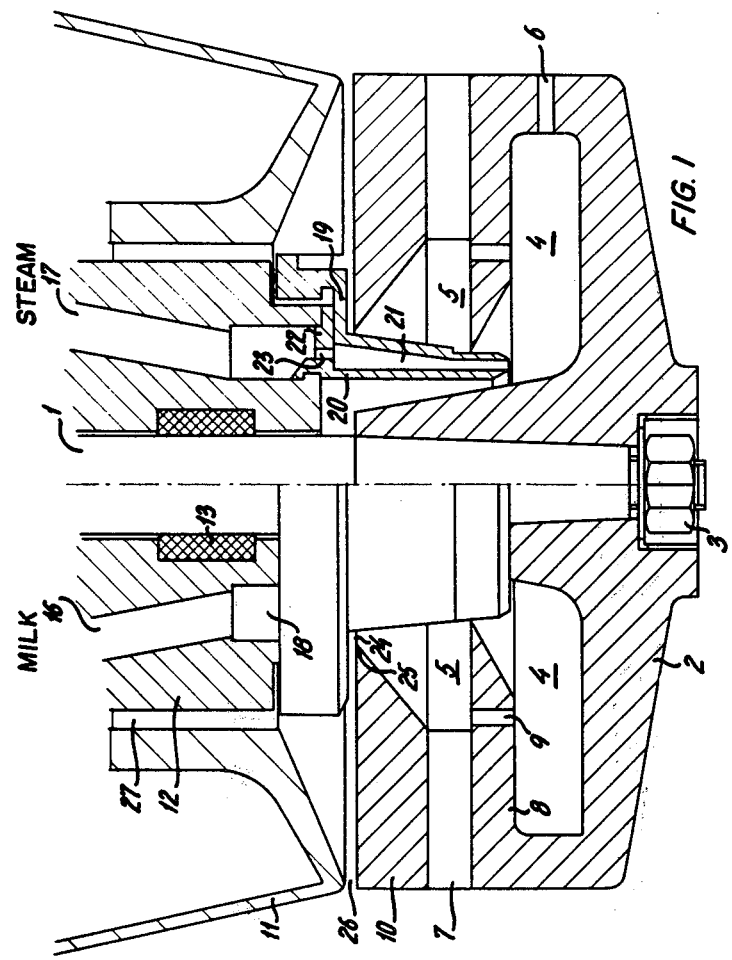

United States Patent [19]

Pisecky et al.

[11] 4,141,783

[45] Feb. 27, 1979

[54] SPRAY DRYING ATOMIZER WHEEL

[75] Inventors: Jan Pisecky, Tastrup; Ib H. Sorensen, Frederikssund, both of Denmark

[73] Assignee: Aktieselskabet Niro Atomizer, Sobor, Denmark

[21] Appl. No.: 785,147

[22] Filed: Apr. 6, 1977

Related U.S. Application Data

[63] Continuation of Ser. No. 390,273, Aug. 21, 1973, abandoned.

[30] Foreign Application Priority Data

Aug. 29, 1972 [DK] Denmark .................. 4269/72

[51] Int. Cl.² ............................................. B01D 1/18
[52] U.S. Cl. ................................. 159/4 S; 159/4 ST; 159/4 B; 426/471; 426/476
[58] Field of Search ................ 159/4 S, 4 B, 48 R, 159/48 L, 42, 49; 426/471, 486, 487, 490; 55/36

[56] References Cited

U.S. PATENT DOCUMENTS

| | | | |
|---|---|---|---|
| 1,779,296 | 10/1930 | Spross | 159/4 S |
| 2,216,815 | 10/1940 | Hall | 159/4 S |
| 2,368,049 | 1/1945 | Stratford | 159/4 S |
| 2,850,085 | 9/1958 | Nyrop | 159/4 S |
| 2,873,799 | 2/1959 | Earley | 159/4S |
| 2,889,873 | 6/1959 | Sauter | 159/4 S |

FOREIGN PATENT DOCUMENTS

| | | | |
|---|---|---|---|
| 65538 | 1947 | Denmark | 159/4 S |
| 991832 | 1902 | France | 159/4 B |
| 138705 | 1961 | U.S.S.R. | 159/4 S |

*Primary Examiner*—Norman Yudkoff
*Attorney, Agent, or Firm*—Sughrue, Rothwell, Mion, Zinn & Macpeak

[57] ABSTRACT

Milk or similar liquids are spray dried using a rotary atomizer wheel whereby such a temperature is imparted to the liquid that a violent release of gas and vapor from the liquid takes place in the atomizer wheel, which gas and vapor are removed before the atomization of the liquid. By these means a powder having at high bulk density and a low content of occluded air is obtained. A special atomizer wheel, having two sets of ejection apertures and two intercommunicating supply compartments makes it possible to eject released gas and vapor through one set of apertures and liquid through the other set, whereby reintroduction in the liquid of the released air is prevented. Also an atomizer wheel of this type is provided wherein the two supply compartments are steam-swept.

4 Claims, 4 Drawing Figures

SPRAY DRYING ATOMIZER WHEEL

This is a continuation of application Ser. No. 390,273, filed Aug. 21, 1973, now abandoned.

The present invention relates to the production of powder from milk or similar liquids by spray drying while employing a rotary atomizer and by heating the liquid prior to the atomization. The expression "milk or similar liquids" must in this context be taken to mean liquids in which — during the first drying stage — a tough film is formed around the particles of liquid formed by the atomization which, during the continued drying process, swell due to the increased pressure as a consequence of the internal evaporation and release of air contained in the liquid, in contrast to liquids on the drops of which — during the first drying stage — a firm crust or shell is formed, through which the liquid or the steam as well as occluded air migrate or — if too high an internal pressure is generated — a bursting of the crust or shell takes place.

In the conventional spray drying methods for milk or similar liquids, a content of air in a dissolved or dispersed form together with the characteristic mentioned leads to the produced powder acquiring a large volume of vacuoles and, for this reason, a low bulk density. The low bulk density results in a correspondingly high consumption of container material and a corresponding space requirement when the powder is shipped and stored. Furthermore, the occluded air is released when the powder is dissolved and will consequently give rise to a trouble some formation of foam when the powder is added to water. Finally, the voluminous structure of the powder obtained will result in it being particularly vulnerable to harmful influences from the surrounding air, in particular oxidation and absorption of humidity, just as the occluded air in itself may give rise to a detrimental oxidation of the powder and the last-mentioned oxidation cannot, of course, be avoided by storing the powder in an inert gas or in a vacuum.

As examples of material during the spray drying of which the aforementioned disadvantages manifest themselves, there may be mentioned — in addition to milk and liquids that contain milk, including such which form the starting material when producing foodstuffs, beverages and fodder—gelatine solutions which contain vitamin A. When spray drying gelatine solutions containing vitamin A, the air contained in the solution will lead to the vitamin A content of the powder obtained being reduced as a consequence of oxidation that is caused, on the one hand, by the oxygenous air occluded in the vacuoles of the powder and, on the other hand, by the oxygen of the atmosphere which can particularly easily attack the vitamin A on account of the special structure which the powder acquires by reason of the air content of the initial solution.

Egg white may be mentioned as a further example of a liquid which, for the above-stated reason, provides a powder which is more voluminous than is desirable.

As a rule, atomization with the aid of conventional nozzles does yield a smaller volume of occluded air than atomization by means of a rotating atomizer wheel, but the capacity of the conventional nozzles is very low so that it is necessary to employ a great number of nozzles in order to achieve the same production capacity that it is possible to achieve with a single conventional atomizer wheel. It is true that in recent years nozzles have been developed that have a very high capacity, when being atomized with such nozzles, however, the powder acquires just as high a content of occluded air as when a conventional rotating atomizer wheel is employed.

In British patent specification No. 1,044,501, a method is stated which, inter alia, results in obtaining a lower occluded air content in a powdered milk product and which involves a preceding concentration of the milk to a solids content of preferably 50-55% and its heating prior to atomization to a temperature that, by preference, is about 60°-65° C. However, the object of this heating process appears to be to avoid a crystallization of lactose during the drying operation since the employment of a particularly strong concentration of the starting material is stated to be decisive for the obtaining of a high bulk density. It is stated in the patent specification that the method is particularly expedient when nozzles are employed for the atomization process, but that it is sometimes possible to achieve good results by utilizing a centrifugal atomizer. As far as the latter case is concerned, it is stated that in tests a bulk density of 0.55 g/cm$^3$ of the spray dried product was obtained and a proportion of occluded air of 20-30 cm$^3$ per 100 grammes. It is desirable, however, to obtain a significantly lower occluded air content and a correspondingly higher density.

When employing two-fluid nozzles it is known to use steam instead of compressed air as atomization medium. It is true that this also produces a heating, but the effect consists primarily in that the whipping-in of additional air into the liquid in the nozzle is somewhat decreased hereby.

It is known from German published specification DAS No. 1.105.347 that it is possible to reduce or increase the powder bulk density by respectively increasing or reducing the air content in the liquid that is to be spray dried. Agitation in a vacuum, possibly with the use of ultra-sound is recommended for removing the air. However, if a liquid that is thus degasified in a special step which precedes the spray drying process, is atomized with a rotating atomizer wheel, it will be able to absorb air in that instant when it is introduced into the atomizer wheel and subjected to a strong acceleration.

It is known, for instance, from U.S. Pat. No. 2,268,871, to subject milk which is to be spray-dried to an evaporation process in a vacuum. Hereby a substantial proportion of the air present in the milk will, of course, be removed, however, in this case the milk will also be able to absorb air again when it is introduced into the atomizer wheel since, at this moment, the temperature of the milk is lower than its boiling point at the pressure existing in the atomizer wheel.

Moreover, it is known from U.S. Pat. No. 2,850,085 that a powder with a lower air content and a higher bulk density can be obtained by reducing the air content of the liquid by centrifuging prior to the atomization. However, this method renders possible solely the removal of air that is present in the liquid in the form of small bubbles but, on the other hand, not air which is to be found actually dissolved in the liquid.

The present invention aims at more effectively obviating the disadvantages mentioned in the foregoing which are due to the air content or air inclusion in the liquid to be spray dried by employing a rotating atomizer wheel and, according to the invention, this is achieved by imparting to the liquid such a temperature, that in the very atomizer wheel, a strong degasification and possibly boiling take place and by the liberated gas being removed prior to the atomization.

By operating with such a temperature so that a strong degasification takes place, which generally means a temperature that lies on or close to the boiling point at the existing pressure, it is possible to remove most of the air content of the liquid, however, in order to achieve the desired result it is necessary for this degasification to take place during the proper introduction of the liquid into the atomizer wheel shortly before the atomization, as well as that the gas generated has to be removed prior to the atomization as otherwise the risk exists that the liquid once more takes up air before the atomization.

The requisite temperature can be imparted by heating the liquid either as an independent step or as an element in a preceding treatment.

No special gasliberation need occur at the point where the heating process is carried out as long as it is insured that the temperature obtained results in a strong liberation of gas or vapor, at the point where the liquid is introduced in the atomizer wheel at that moment when the liquid is exposed to a strong acceleration and where it otherwise would be inclined to take up air.

By way of example, it is thus possible to carry out a heating to approx. 100° C. or higher in the feed pipe of the atomizer without any significant gasification taking place since, as a rule, a substantial excess pressure and, for this reason, a high boiling point temperature will prevail in the feed pipe, however, when the liquid thus heated flows into the atomizer wheel where a significantly lower pressure exists, a very strong gasliberation is going to take place there.

It has been found that it is possible to achieve extremely good results by the method according to the invention since a milk powder can be obtained thereby with an occluded air content of right down to 5 cm$^3$ per 100 grammes, which is considerably less than what is obtained with the method described in U.S. Pat. No. 2,850,085 referred to in the foregoing.

Likewise, when spray drying egg white, a less voluminous product is obtained than has been possible so far. The same applies when spray drying gelatine solutions containing vitamin A and, in this case, the special advantage is achieved that the powder obtained acquires improved keeping qualities since the oxidation of the vitamin occurs to a lesser degree.

According to the invention, the heating can be effected by supplying steam to the liquid at a point from which the liquid moves to the ejection apertures during an interval which is sufficiently short for avoiding that the solids of the liquid are heat damaged. By the heating process thus being effected by steam being supplied direct it is achieved that the liquid is very quickly brought to the desired temperature so that the risk of damaging the solids of the liquid during the heating period itself is reduced.

However, if the liquid to be spray dried does not tolerate direct contact with steam, it is possible according to the invention to carry out indirect heating at a point from which the liquid moves to the ejection apertures during an interval that is sufficiently short for avoiding that the solids of the liquid are heat damaged.

In an embodiment of the method according to the invention the heating takes place in the feed pipe of the atomizer or a liquid distributor connected hereto, which renders a simple and easily adjustable heating possible.

However, in order to render the period during which the liquid is at an elevated temperature as short as possible, it may be expedient according to the invention to carry out the heating in the atomizer wheel itself.

It has been found that the volume of occluded air is reduced to a particularly high degree when the heating takes place, on the one hand, in the feed pipe of the atomizer and, on the other hand, by injecting steam into the atomizer wheel since the degasification as well as the removal of the gas hereby become particularly effective.

In those instances where the risk exists that the heating of the liquid to the temperature at which the liquid boils at atmospheric pressure has a detrimental effect on it, it is expedient that a vacuum be produced in the liquid supply compartment of the atomizer wheel in order to reduce the boiling point of the liquid.

In addition, the invention relates to an atomizer for use in carrying out the method and of the type having an atomizer wheel which is constructed with two sets of ejection apertures mounted in mutually spaced relationship in the axial direction, which two sets of apertures each comminicate with their own of two supply compartments placed annularly around the axis of the wheel, and the characteristic feature of this atomizer according to the invention consists in that one of the supply compartments communicates with at least one feed pipe for the liquid, and in that the two supply compartments intercommunicate by means of at least one aperture, as well as in that the ejection apertures of the other supply compartment are constructed in such a way that the fan effect produced thereby exceeds the fan effect produced by the ejection apertures of the first supply compartment.

In the case of the prior art atomizer wheels provided with two sets of ejection apertures each communicating with its own of two supply compartments, two different materials, e.g. two different liquids, are conducted to the two supply compartments in such a way that the two materials are atomized separately. In the case of the atomizer according to the invention, only one supply compartment of the wheel with the connected ejection apertures is utilized for the atomization, while the other supply compartment which communicates with the first one by means of a plurality of apertures or a central opening is, in actual fact, utilized as a centrifugal fan for drawing out by suction the gas generated in the first supply compartment by employing the method according to the invention.

It is conceivable to carry out the method by means of a single atomizer wheel, in which method the gas generated is extracted by suction in a corresponding manner in that blades are mounted on the wheel in the gap between the wheel and the stationary casing of the atomizer. Thereby, a corresponding extraction by suction of the gas can be achieved, but since, as a rule, a substantial amount of droplets of liquid will always be carried along with the gas, there exists a big risk in this case of deposits forming on the casing and on the exterior of the wheel causing frequent operational interruptions. In the atomizer according to the invention this is avoided because the liquid droplets which are entrained by the gas are flung out through the ejection apertures of the other supply compartment together with the gas.

However, it is also possible to work the method according to the invention by employing a conventional atomizer wheel that is so dimensioned that the ejection apertures — in the course of the operation — are not completely or partly filled with liquid, for instance, the type of wheel in which the ejection apertures are constructed as ducts having a rectangular cross-section where the liquid passes through the ducts as a relatively thin layer on one of the duct walls. In such a wheel the gas generated will, due to the fan effect, be blown out via the ducts and experience has shown that in such wheels no particular tendency exists towards the liquid taking up air while passing as a thin film along the walls of the ducts, thus there will exist no risk either when working the method that the gas which has been given off will once more be taken up in the ducts.

However, difficulties may arise if the gasification were to continue to any significant degree in the thin layer of liquid in the ducts, for which reason, as a rule, the atomizer according to the invention will be given preference since it will then be possible to run the atomizer wheel with the ejection apertures filled with liquid to a greater extent and yet to have — with absolute certainty — the generated gas removed.

Figure 2:
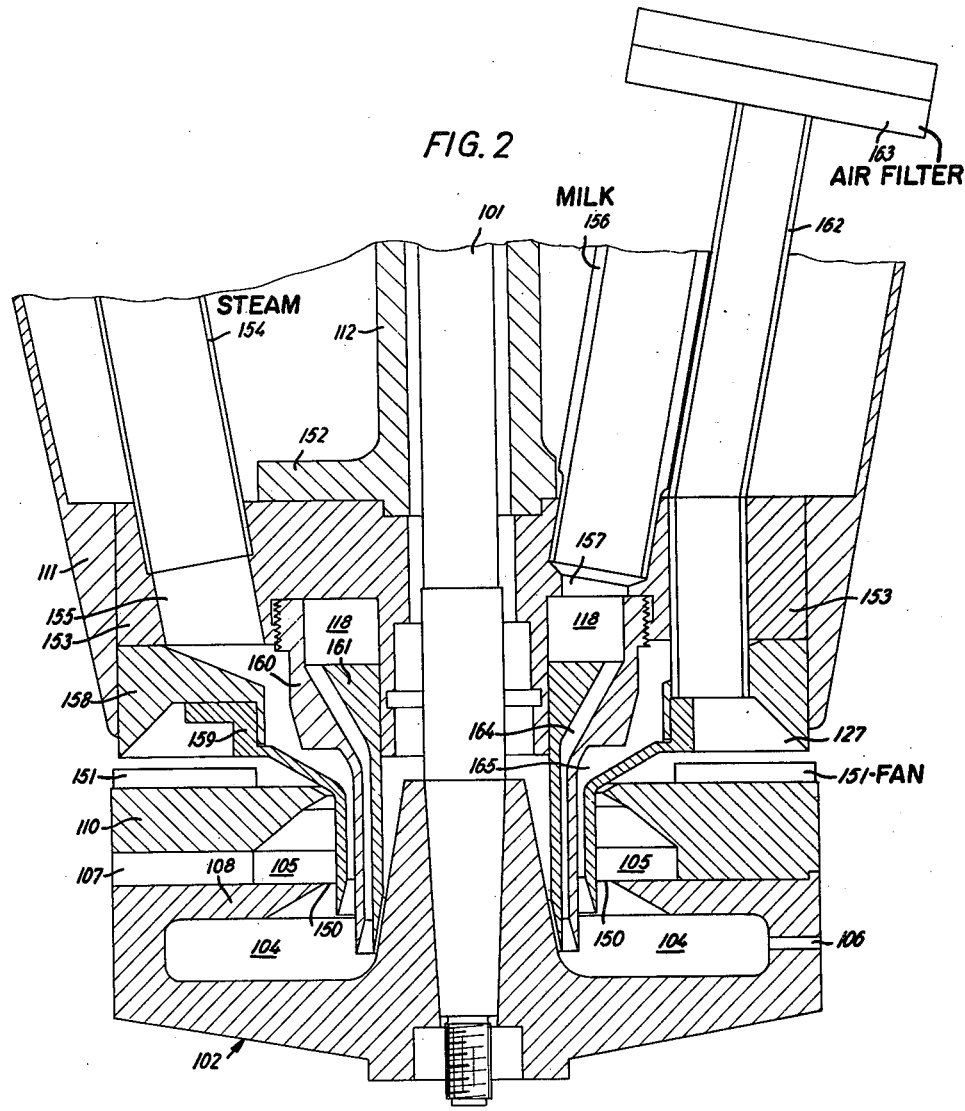
Figure 3:
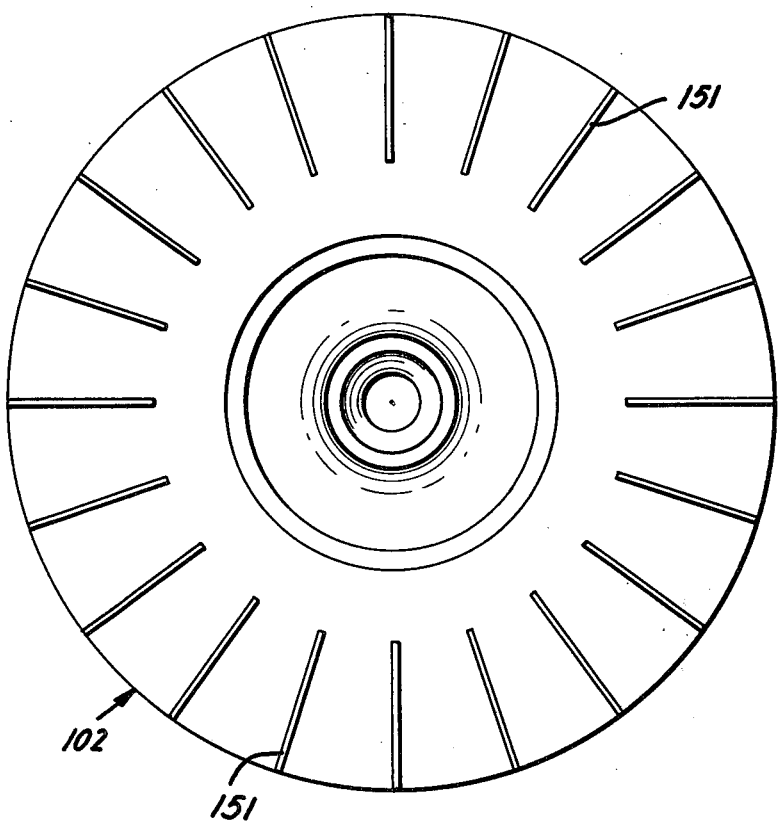
Figure 4:
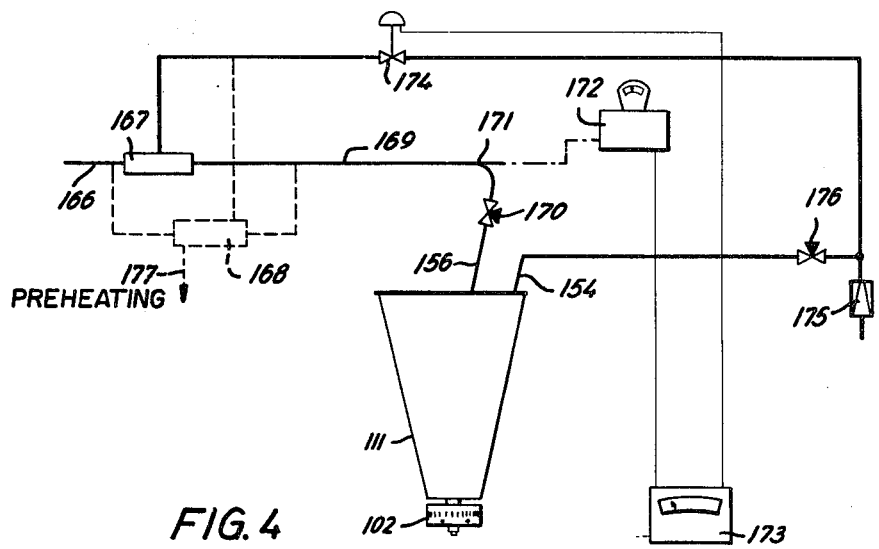

The invention is explained below in greater detail with reference to the accompanying drawings, in which FIG. 1 schematically and partly in section shows, the lower portion of an embodiment of the atomizer according to the invention, FIG. 2 schematically shows a section through the lower portion of another embodiment of the atomizer according to the invention on a somewhat reduced scale, FIG. 3 shows schematically the atomizer wheel depicted in FIG. 2 seen from above, and FIG. 4 is a flow sheet illustrating a preferred embodiment of the process according to the invention.

The atomizers shown in FIG. 1-4 are particularly well-suited for carrying out the method according to the invention, it will have to be understood, however, that it is possible to work the method with many other types of atomizers as long as these are constructed in such a way that the special feature of the method stated by the invention can be carried into effect.

When in use, the atomizers shown in the drawings are mounted in a conventional manner in drying chambers that are not shown.

In FIG. 1, shaft 1 of the atomizer is seen, on the lowermost end of which an atomizer wheel 2 is secured by means of a nut 3.

The atomizer wheel has two superposed supply compartments 4 and 5 which are constructed as annular chambers placed coaxially with shaft 1.

From supply compartment 4, a plurality of ejection apertures 6 lead out to the circumference of the wheel and from supply compartment 5, a plurality of ejection apertures 7 lead out to the circumference of the wheel.

In the embodiment depicted, apertures 6 are constructed as cylindrical bores and, by way of example, there may be distributed four of these spaced 90° apart.

The ejection apertures 7 are, in the embodiment shown, constructed as ducts having a rectangular cross-section and, by way of example, 24 of them can be evenly distributed.

The two supply compartments 4 and 5 are separated from one another by means of a horizontal partition 8, but they intercommunicate by means of bores 9 provided in this partition 8 and, by way of example, four of these bores may be provided.

The wheel thus differs from the conventional two-stage wheels in that the two supply compartments intercommunicate.

The portion of the atomizer located above the atomizer wheel is surrounded by a stationary casing 11 which has a conical, downwardly tapering external surface, the smallest diameter of which corresponds to the external diameter of atomizer wheel 2.

At the bottom of casing 11, shaft 1 is surrounded by a supporting member 12 which forms the termination of a bearing tube (not shown). A guide bearing 13 for shaft 1 is inserted into supporting member 12.

The atomizer is equipped with two feed pipes (not shown), each of which, via its own duct 16 and 17, respectively, communicates with an annular chamber 18 that is constructed in the supporting member 12 at its lowermost end and is located coaxially with shaft 1.

At the bottom of supporting member 12, a liquid distributor 19, 20 consisting of two sleeve-shaped elements 19 and 20 is mounted concentrically around shaft 1, between which elements an annular duct 21 is formed.

Annular chamber 18 is separated from duct 21 by means of a flange 22 on element 20 in that communication between annular chamber 18 and duct 21 is established by means of bores 23 provided in flange 22.

Elements 19 and 20 and, thereby, annular duct 21, lead right down into supply compartment 4 which thus communicates with the feed pipes.

When employing the described atomizer for working the method according to the invention it is possible, for example, to supply skimmed milk concentrate via duct 16 and saturated steam under an appropriate over pressure via duct 17.

The steam is then mixed with milk concentrate in annular chamber 18 and hereby heats the concentrate.

Due to the pressure, no significant gasliberation takes place in annular chamber 18, however, when the liquid — via annular duct 21 — flows down into supply compartment 4 in which a considerably lower pressure exists, a strong release of gas occurs. In this case, the gas consists of a mixture of air and steam.

Due to the rotation of the wheel, the liquid is flung out in a known manner through ejection apertures 6 and is atomized in a drying chamber (not shown), in which the particles of liquid are dried by means of hot air so that a milk powder is formed.

The upper portion of the atomizer wheel with supply compartment 5 and ejection apertures 7 acts as a centrifugal fan so that a partial vacuum is produced in supply compartment 5. As a matter of fact, such a partial vacuum is likewise produced in supply compartment 4, but the pressure in compartment 5 becomes significantly lower than in compartment 4, with the result that the gas generated in compartment 4 is extracted by suction through apertures 9 at the top of compartment 5 and is blown out via apertures 7.

By the release of gas in compartment 4, liquid will inevitably be carried along which, together with the gas, is drawn up by suction into compartment 5 and, together with the gas, is flung out via apertures 7 in the form of liquid particles which mix with the main volume of the particles that are ejected from apertures 6.

Between the rotating and the stationary components there has, of necessity, to exist a certain spaced relationship and a gap 24 is thus produced at the innermost edge 25 of covering member 10 and a gap 26 is likewise formed between the wheel and casing 11.

The partial vacuum in compartment 5 could thus entail the risk of air being drawn in by suction through gap 26 from the surrounding drying chamber and thereby carry along humid particles that may settle on the edge of the wheel and the casing and, on account of the temperature prevailing at this point, dry into a hard deposit which can relatively quickly fill gap 26 and thereby impede the operation of the atomizer.

In order to obviate this, an annular duct 27 is formed between cap 11 and supporting member 12 which, in a manner that has not been illustrated, communicates freely with the atmosphere, preferably via a filter.

Since a substantially lower air flow resistance exists in annular duct 21 than in gap 26, the suction produced via gap 24 will mainly draw air via duct 27 to compartment 5 and since, in addition, the surface of the rotating wheel leads to a certain fan effect, air emanating from duct 27 will be blown out via gap 26 so that a good safeguard against deposits is provided.

The effect can be intensified by vanes being mounted on the top side of the wheel (corresponding to the arrangement shown in FIG. 2) and these may possibly be dimensioned in such a way that the fan effect produced is sufficient to overcome the suction through duct 24 and, if this happens to be the case, annular duct 27 can be dispensed with.

A compressed air supply may possibly be connected to annular duct 27.

Instead of using one of the feed pipes for liquid and the other one for steam, the liquid can be supplied via both feed pipes by instead — in the proximity of the atomizer — connecting steam pipes to the feed pipes so that steam is injected into the liquid in this way. Instead of a direct heating process by means of steam, indirect heating may be employed for example, by an appropriate heat exchanger being inserted into the feed pipes.

FIG. 2 shows an embodiment of the atomizer in which it is possible to inject steam into the supply compartment into which the liquid that is to be dried is fed.

An atomizer wheel 102 is secured to the shaft 101 of the atomizer by means of a nut (not shown).

The atomizer wheel has, just as the atomizer wheel shown in FIG. 1, two supply compartments 104 and 105 located on top of one another, that are shaped as annular chambers from which ejection apertures 106 and 107, respectively, issue. These ejection apertures can, for example, be constructed as described in connection with FIG. 1. In all cases the dimensioning and the ratio between the number of apertures 106 and the number of apertures 107 has to be so that the fan effect that is produced by apertures 107 exceeds the fan effect produced by apertures 106.

The two supply compartments are partly separated from each other by a horizontal partition 108. In contrast to partition 8 shown in FIG. 1 there are no bores in partition 108 because these have been rendered superfluous by the fact that the partition does not completely separate the two supply compartments from each other but provides room for an annular duct 150 through which the liberated gas can, together with the steam, be drawn up by suction into compartment 105.

Compartment 105 is upwardly delimited by a covering piece 110, to the top side of which a plurality of vanes 151 are secured whose positioning becomes apparent from FIG. 3.

The portion of the atomizer located above the atomizer wheel is in part surrounded by a casing 111, of which the lower part only is shown.

The upper portion of shaft 101 is surrounded by a supporting pipe of which only the lower part is shown, which supporting pipe terminates in a flange-shaped part 152. To this part 152, an intermediate piece 153 is secured which, in its lower central portion, provides room for a guiding bearing (not shown) for the shaft 101.

The atomizer has a pipe 154 for feeding steam, which pipe communicates with a bore 155 in the intermediate piece 153 and is, in addition, provided with a feeder pipe 156 for liquid that is to be spray dried, which pipe communicates with another bore 157 in the intermediate piece 153.

A supporting ring 158 that is partly surrounded by the casing 111 is secured to the underside of the intermediate piece 153 near its circumference.

An external sleeve-shaped guide wall 159 is mounted on this supporting ring 158 while, at the lower part of the intermediate piece 153, a midmost sleeve-shaped guide wall 160 and an internal sleeve-shaped guide wall 161, are fitted. The guide walls 159, 160 and 161 all lead down into supply compartment 104.

Through bores in the intermediate piece 153 and in supporting ring 153, an air supply pipe 162 is passed which terminates in an annular duct 127 delimited by portions of the external guide wall 159 and the supporting ring 158. In the other end the pipe is connected to an air filter 163.

When the atomizer is operative, shaft 101 and, thereby, wheel 102 are rotated by means of an electric motor (not shown). The liquid that is to be spray dried flows from the pipe 156 via the bore 157 to an annular chamber 118 which is delimited by portions of the intermediate piece 153 and the guide walls 160 and 161. From here the liquid reaches, via an annular duct 164 formed by the guide walls 160 and 161, the part of compartment 104 adjacent to the centre of the atomizer wheel.

At the same time dry, saturated steam is fed through pipe 154 via bore 155 to an annular duct 165 which is delimited at the top by intermeidate piece 153, on the outside by the supporting ring 158 and the external guide wall 159 and on the inside by the internal guide wall 161. From duct 165 the steam reaches compartment 104 as an annular jet which envelopes the space which receives the liquid from duct 164.

When the liquid from duct 164 reaches down into the inner part of compartment 104 a strong degasification and steam generation takes place from the liquid while it, under strong turbulence, is accelerated by the sudden contact with the rotating atomizer wheel. While the liquid subsequently flows towards the ejection apertures 106, the gas and steam generated will be rapidly carried away by the flow of steam from duct 165 so that the risk of gas being again taken up into the liquid is significantly reduced. Beyond this, the flow of steam from duct 165 is of relevance for ensuring that the requisite temperature is imparted to the liquid just at the critical point where it first comes into contact with the rotating wheel.

The flow of steam which has absorbed the gas and vapour liberated from the liquid is drawn by suction, due to the fan effect produced by apertures 107, together with entrained droplets of liquid up into compartment 105 through the annular aperture 150 present between wall 108 and the external guide wall 159. From compartment 105 the steam containing droplets of liquid is ejected via apertures 107.

The vanes 151 exert a fan effect by the rotation of the wheel which results in air being drawn by suction through filter 163, pipe 162 and the annular duct 127 and is blown out through the gap between supporting ring 152 and covering piece 110. Hereby the drawing in of air by suction from the drying chamber through the annular gap between covering piece 110 and the external guide wall 159 to compartment 105 with the herewith associated drawbacks is avoided. By proper dimensioning of the vanes it is possible to achieve an enhancement of the vacuum existing in compartments 104 and 105 which results in a more effective removal of air.

FIG. 4 illustrates schematically an expedient arrangement of connecting means for the atomizer shown in FIG. 2.

The liquid that is to be spray dried is pumped, via a supply line 166, to a unit 167 for direct steam injection. Alternatively it is possible for the liquid to be conducted to a heat exchanger 168 for indirect heating. This latter alternative can be considered particularly when liquids have to be dried the heating of which with direct steam is forbidden by law.

From unit 167 or 168, the liquid is led, via a line 169, to a needle valve 170 which communicates with pipe 156 which is identical with the corresponding pipe in FIG. 2.

A temperature sensor 171 is inserted into line 169 and is connected with a transmitter 172. This communicates, e.g. pneumatically, with a controller 173 which likewise e.g. pneumatically, controls a regulating valve 174 for steam.

From a reduction valve 175, saturated, dry steam is led, on the one hand, via a needle valve 176 to pipe 154 (which is identical with the correspondingly designated pipe in FIG. 2) and, on the other hand, via the abovementioned valve 174 controlled by regulator 173 to unit 167 for direct steam injection or to heat exchanger 168. In the latter case the partly condensed steam leaves via a duct.

It goes without saying that in the practical construction of the system manometers and more valves than those shown will be inserted.

EXAMPLE 1

A spray drying plant of the make NIRO ATOMIZER was employed in the test. The diameter of the drying chamber was 6 m. The plant was equipped with a centrifugal atomizer as shown in FIG. 1. The diameter of the wheel was 210 mm and the lower supply compartment was provided with four ejection apertures having a diameter of 2 mm. The width of the gap between the wheel and the stationary casing of the atomizer was 3 mm. The coaxial duct 27 in the atomizer was 5 mm wide and communicated with the atmosphere outside the drying chamber via a filter.

380 kg/h of skimmed milk concentrate having a solids content of 43% and a temperature of 30° C. was pumped to the atomizer from a tank. Approximately 1.5 m before the atomizer, a pipe was connected to the feed line for the concentrate, from which pipe saturated steam at a pressure of 2.5 kg/cm$^2$ was injected in such a quantity that the temperature of the concentrate was brought to 101° C.

The rate of rotation of the atomizer wheel was 14500 r.p.m. Drying air was supplied in a quantity of 8500 kg/h at an inlet temperature of 170° C., the outlet temperature was 92° C.

The bulk density of the skimmed milk powder produced was 0.79 g/cm$^3$ (tapped 100 times), the volume of occluded air was 5.9 cm$^3$/100 g (measured on a Beckman air comparison pycnometer, by setting the specific density of the skimmed milk material to 1.52 g/cm$^3$).

The water content of the powder, measured by drying in 3 hours at 105° C., was 3.6%, the solubility index according to ADMI standard method was 0.15 ml and the grade of burned particles according to ADMI standard was A.

EXAMPLE 2

Tests were carried out in the same plant as described in Example 1, but the concentrate was, at a temperature of approx. 40° C., pumped to the atomizer through one of its feed pipes, and saturated steam at a pressure of 2.0 kg/cm$^2$ was passed through the other feed pipe. The quantities involved were 600 kg/h concentrate and 90 kg/h steam.

The inlet temperature of the drying air was 210° C., its outlet temperature was 90° C.

The other conditions were as in Example 1.

The bulk density of the powder produced in this case was also 0.79 g/cm$^3$ (tapped 100 times), the content of occluded air was 8.0 cm$^3$/100 g, its water content was 3.4% and the solubility index was 0.1 ml.

COMPARISON EXAMPLE A

Tests for the purpose of comparison were carried out in three other spray drying plants I, II and III of the same type as in Example 1, but the atomizer wheels employed were, on the one hand, of conventional construction with straight radial ducts and, on the other hand, of the type provided with curved ducts as described in U.S. Pat. No. 2,850,085. Skimmed milk concentrate was dried in all the tests.

|  | Plant I | Plant II | Plant II | Plant III |
|---|---|---|---|---|
| Atomizer Wheel | Straight ducts | Straight ducts | Curved ducts | Curved ducts |
| Rate of Rotation r.p.m. | 15000 | 15000 | 15000 | 15000 |
| Solids Content in Raw Material | 41% | 47% | 47% | 48% |
| Drying Gas Inlet Temperature | 200° C | 205° C | 204° C | 210° C |
| Outlet Temperature | 95° C | 91° C | 92° C | 94° C |
| Humidity Content of Powder Produced | 3.6% | 4.3% | 4.4% | 3.9% |
| Bulk Density g/cm$^3$ | 0.52 | 0.58 | 0.64 | 0.60 |
| Occluded Air cm$^3$/100 g | 50.5 | 35.3 | 22.8 | 24.1 |
| Solubility Index | <0.1 | 0.2 | 0.2 | 0.3 |

EXAMPLE 3

A spray drying plant of the same type as in Example 2 was used, but its drying chamber diameter was 2.25 m.

An emulsion containing vitamin A, gelatine and whey solids having a total solids content of 41% was dried. At a temperature of 30° C., the emulsion was pumped to the atomizer through one of its feed pipes and saturated steam at a pressure of 2 kg/cm$^2$ was fed through the other feed pipe. The quantities involved were 70 kg/h emulsion and 7 kg/h steam.

The atomizer wheel was of the same type as described in Example 1, but its diameter was 120 mm. Its rate of rotation was 12000 r.p.m. The inlet temperature of the drying air was 150° C., its oulet temperature was 90° C.

The powder produced had the following properties:

Water Content: 3.3%
Bulk Density: 0.55 g/cm$^3$ (tapped 100 times)
Content of Occluded Air: 19.3 cm$^3$/100 g

COMPARISON EXAMPLE B

A test for the purpose of comparison was carried out in the same plant and under the same process conditions as in Example 3, the diameter of the atomizer wheel was also 120 mm in this case.

The powder produced had the following properties:

Water Content: 3.5%
Bulk Density: 0.5 g/cm$^3$ (tapped 100 times)
Content of Occluded Air: 38.9 cm$^3$/100 g

EXAMPLE 4

A test was carried out in the same plant as described in Example 1, the atomizer employed was, however, as shown in FIGS. 2 and 3 and it was connected as shown in FIG. 4. This is to say that dry, saturated steam was supplied, on the one hand, by direct injection into the feed conduit for the milk concentrate and, on the other hand, through a feed pipe to an annular duct that terminated in the atomizer wheel.

580 kg/h skimmed milk concentrate having a solids content of 45% and a temperature of 43° C. were supplied.

Dry, saturated steam in a quantity of 50 kg/h was injected direct into the concentrate. The temperature of the concentrate hereby rose from 43° C. to 90° C. 35 kg/h steam were fed to feed pipe 154.

The rate of rotation of the atomizer wheel was 15,000 r.p.m. The inlet temperature of the drying air was 185° C. and the inlet temperature was 94° C.

The bulk density of the skimmed milk powder produced was 0.78 g/cm$^3$ (tapped 100 times), the quantity of occluded air was 6.7 cm$^3$/100 g, the water content was 3.8% and the solubility index 0.1 ml.

What we claim is:

1. An atomizer comprising:

(a) an atomizer wheel having means defining two annular compartments, the wheel further having in its periphery a first set of ejection apertures connected to one of the compartments and a second set of ejection apertures connected to the second compartment, said first set of ejection apertures being constructed in such a way that they are substantially filled with liquid during the operation of the atomizer, the wheel having means for providing fluid communication between the two compartments,
   (b) a shaft on which the atomizer wheel is secured,
   (c) means for rotating said wheel,
   (d) a stationary casing having means defining two concentric ducts annularly around the shaft which both terminate in the first compartment,
   (e) an inlet pipe for liquid communicating with one of the concentric ducts, and
   (f) an inlet pipe for steam communicating with the other of the concentric ducts.

2. An atomizer as claimed in claim 1, wherein the gap between the stationary casing of the atomizer and the atomizer wheel communicates freely with the atmosphere outside the drying chamber and, a filter interposed between the gap and the outside atmosphere.

3. An atomizer as claimed in claim 1, wherein a feed pipe is disposed between the atomizer wheel and the stationary casing of the atomizer for supplying air under a pressure which is sufficient to impede an inwardly directed airstream in the gap between the wheel and the casing.

4. An atomizer as claimed in claim 1, characterized in that on the side of the atomizer wheel facing toward the stationary casing of the atomizer a plurality of vanes are mounted to impede an inwardly directed airstream in the gap between the wheel and the casing.

* * * * *